March 30, 1954

G. H. LOOCK 2,673,712

PORTABLE HOLE DIGGER

Filed July 26, 1950

INVENTOR
GERALD H. LOOCK.

BY Gustave Miller
ATTORNEY

March 30, 1954

G. H. LOOCK 2,673,712

PORTABLE HOLE DIGGER

Filed July 26, 1950

INVENTOR
GERALD H. LOOCK.

BY Gustave Miller
ATTORNEY

INVENTOR
GERALD H. LOOCK.
BY Gustave Miller
ATTORNEY

Patented Mar. 30, 1954

2,673,712

UNITED STATES PATENT OFFICE 2,673,712

PORTABLE HOLE DIGGER

Gerald H. Loock, Blythe, Calif.

Application July 26, 1950, Serial No. 175,997

6 Claims. (Cl. 255—19.1)

This invention relates to a portable hole digger and has for an object to provide an improved portable hole digger which utilizes a comparatively simple gearing whereby it can be manufactured and sold at a reasonable cost.

A further object of this invention is to provide a portable hole digger which is comparatively small and capable of being transported by any small truck or jeep, yet is capable of doing the same work as larger machines but at a considerably lower cost per hole, yet with just as great rapidity.

A further object of this invention is to provide a portable hole digger which may be powered by a conventional automobile engine and transmission whereby the digging orbit may be reversed if necessary so that it may be turned backward to screw itself out of the hole should it become stuck therein.

While there are many existing disclosures of portable hole diggers, such as in Patents Nos. 1,397,324, 1,643,549, 2,001,502, 2,255,241, 2,348,024, 2,410,959, this invention is an improvement thereover in simplicity of details of construction and operation, and providing a portable hole digger capable of performing all the functions of the larger machine at a lesser initial and lesser upkeep cost.

A further object of this invention is to provide a portable hole digger which is more compact than previous machines for the same purpose.

A further object of this invention is to provide a small, compact hole digger which may be transported into out-of-the-way locations and which may dig the desired hole either absolutely vertically or at a desired angle irrespective of whether the ground surface is level or somewhat angular or hilly.

With the foregoing and other objects in view, as will hereinafter become apparent, this invention provides the constructions, combinations and arrangement of parts hereinafter set forth, claimed and disclosed in the accompanying drawing, wherein:

Fig. 6 is a fragmentary sectional detail of the top of the digging shaft and housing.

Fig. 7 is a view at right angles to Fig. 6.

Fig. 8 is a rear-end view of Fig. 1 showing the angular adjustability.

Fig. 9 is a perspective view of a housing structure showing means mounted thereon for angularly adjusting the digging shaft.

Fig. 10 is a fragmentary elevational detail illustrating one of the journal pins and the bearing means therefor.

Figure 1:
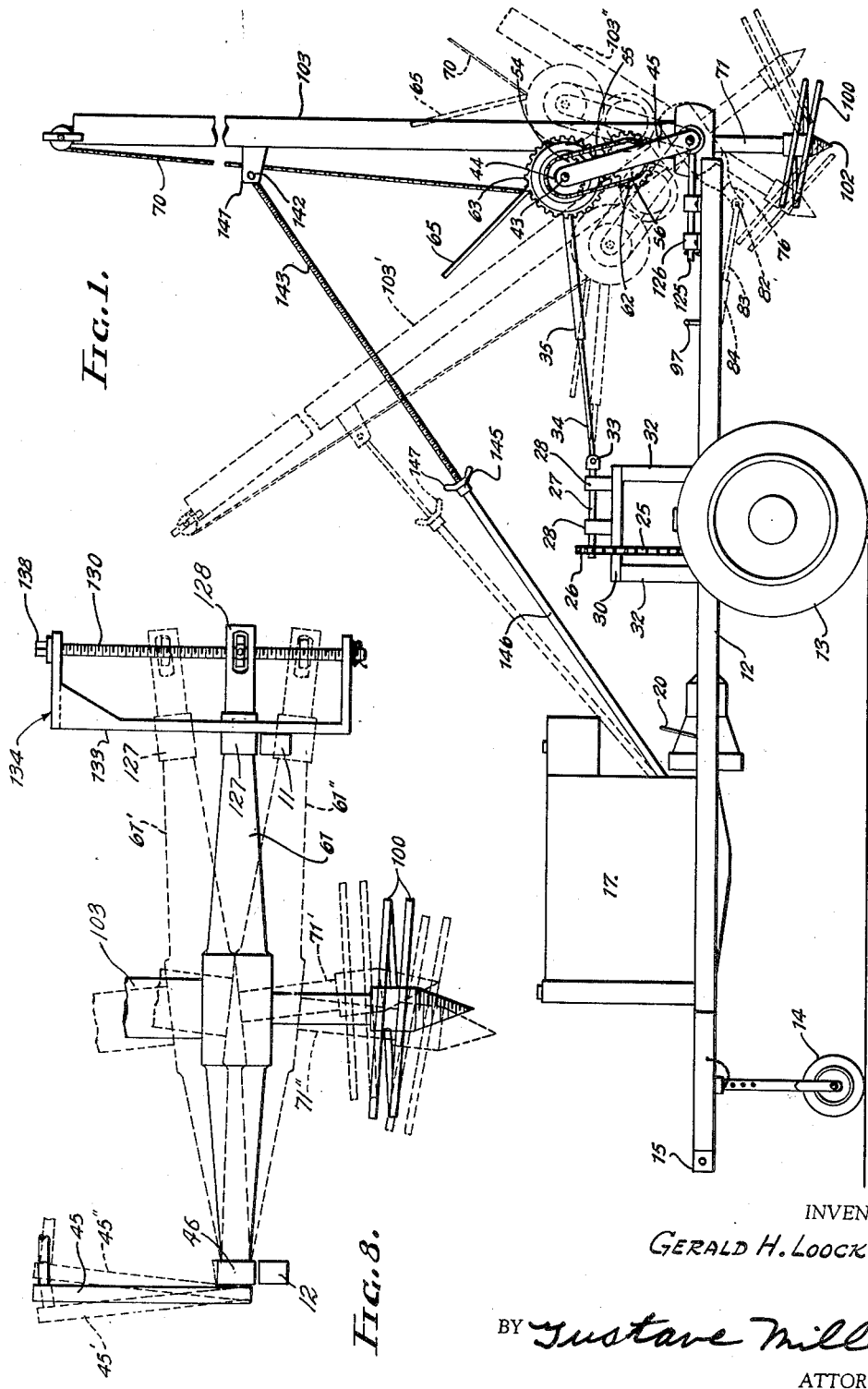
Fig. 1 is a side plan view of the portable digger of this invention.
Figure 2:
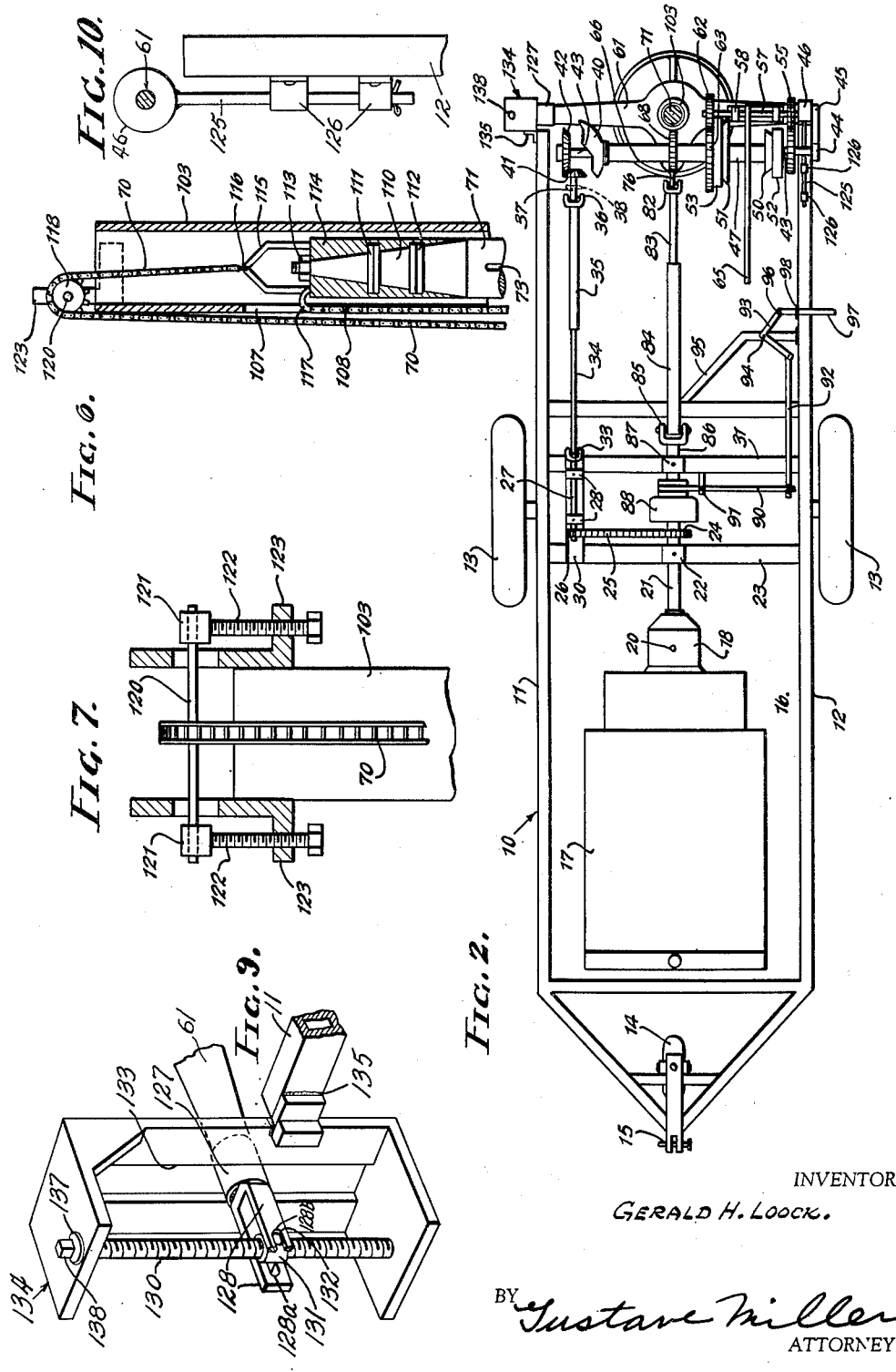
Fig. 2 is a top plan view of Fig. 1.
Figure 3:
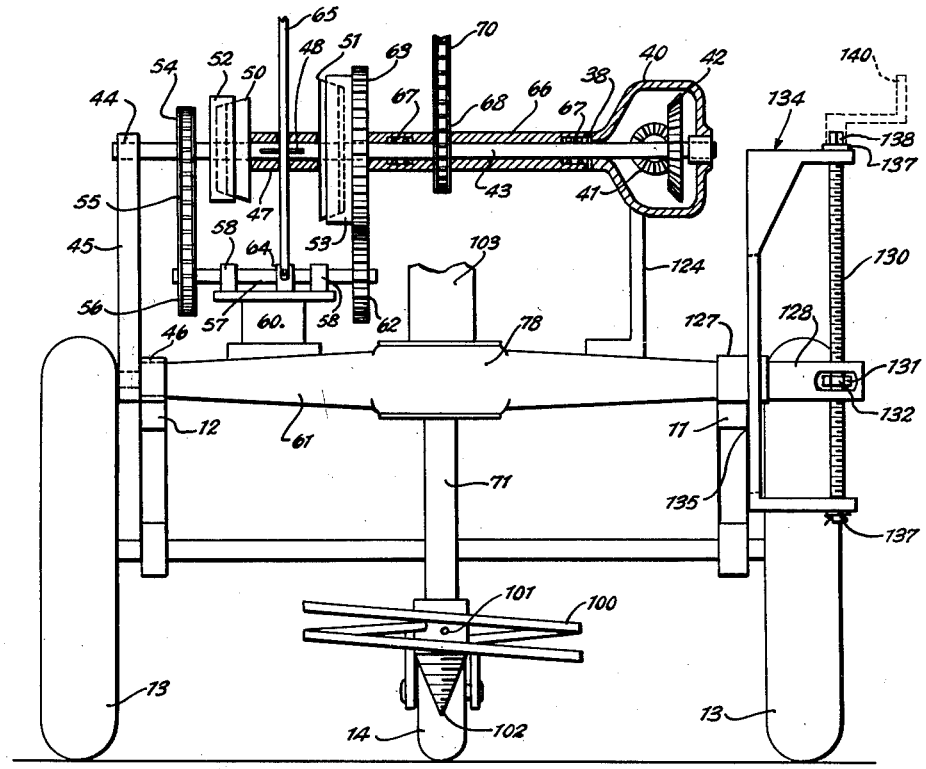
Fig. 3 is a rear end view of Fig. 2 on a larger scale.
Figure 4:
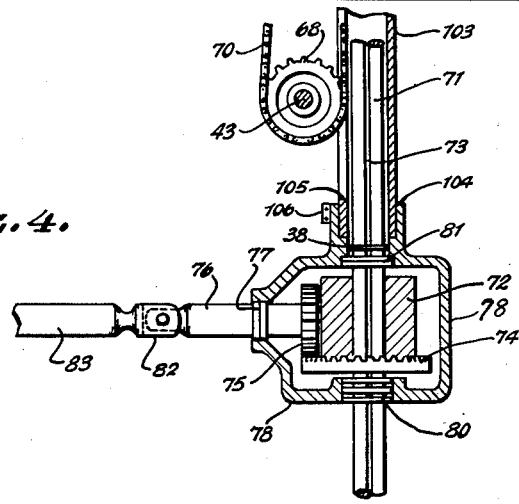
Fig. 4 is an enlarged sectional view showing the power connection to the digging shaft.
Figure 5:
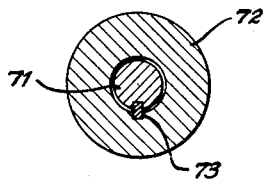
Fig. 5 is a sectional view of the digging shaft and power hub.

There is shown at 10 a trailer truck frame or vehicle frame on which this invention is mounted. This frame 10 includes a pair of chassis members 11 and 12 mounted for transportation on rear wheels 13 and a caster front wheel 14 secured to a trailer hitch 15. The front wheel 14 and trailer hitch 15 would be omitted if the chassis members 11 and 12 were part of a small truck. Supported on the bed 16 of the trailer or truck frame 10 is an automobile engine 17 provided with the conventional three-speed forward and one-speed reversed gear transmission 18, with its usual controls (not shown) and gear shift lever 20.

Extending from the transmission 18 is the main drive shaft 21 whose speed and power are provided from the motor 17 through the transmission 18. The shaft 21 is journaled through a ball bearing 22 mounted on a cross-frame member 23 of the vehicle body. A sprocket gear 24 on the shaft 21 drives a roller chain 25 which in turn drives a sprocket gear 26 on a stub shaft 27 which extends through pillow block bearings 28 mounted on a crossbar 30 supported on uprights 32 between the cross-frame member 23 and a second cross-frame 31, the roller chain 25 extending at approximately 45 degrees.

Secured to the rear end of the shaft 27 is a universal joint 33 which connects to a squared shaft 34 which telescopes into a squared sleeve 35 which in turn is provided with a universal joint 36 connecting it to a stub shaft 37. The stub shaft 37 extends through a grease seal 38 in a gear housing 40, a pinion gear 41 being secured on the end of shaft 37 in mesh with a ring gear 42, the ring gear 42 being fixed on one end of a shaft 43 which extends across the frame and at its other end is journaled in a bearing 44 mounted on an upright 45 whose lower end is secured on a collar 46.

Floating on the shaft 43 is a short housing section 47 keyed as at 48 for rotation therewith and provided at its ends with cone clutch faces 50 and 51 arranged to slide into engagement with the clutch socket 52 or 53. The clutch socket 52 is journaled freely on the shaft 43 and is provided with a sprocket 54 connected by a sprocket chain 55 to a sprocket 56 on one end of a short shaft 57 journaled in bearings 58 on a pillow block 60 supported on a housing 61, the upright 45 and its collar 46 being likewise supported about housing 61. The other end of the short shaft 57 has a gear 62 affixed thereto, which gear 62 meshes with a large gear 63 secured to clutch socket 53. Pivoted in a socket 64 on the pillow block 60 is a clutch lever 65 which cooperates with the short housing section 47 for sliding it back and forth and thus engaging either the clutch cone face 50 with the clutch socket 52 or the clutch cone face 51 with the clutch socket 53. Thus manipulation of the clutch lever 65 in one direction or the other will cause gear 63 to rotate directly with and in the same direction as shaft 43 when clutch socket 53 is engaged by clutch cone face 51 and to rotate in the opposite direction when clutch socket 52 is engaged by clutch cone face 50, only one pair of clutch sockets and clutch cone faces being engaged while the other pair are simultaneously disengaged. In the middle neutral position neither clutch is engaged. The ring gear 63 is fixed on a housing 66 which floats on roller bearings 67 on the shaft 43. Also fixed on the housing 66 is a sprocket 68 engaged by a roller chain 70.

The roller chain 70 serves to raise or lower the digging shaft 71 by means that will be hereinafter described. While only one pair of clutch cones and clutch sockets may be engaged at a time, it will be apparent that the clutch lever 65 may be shifted to a middle position, thus holding both clutch cone faces and sockets simultaneously disengaged. In order to controllably rotate the digging shaft 71, there is provided a hub 72 having a key which slidably engages a longitudinal key slot 73 in the digging shaft 71. This hub 72 is fixedly mounted on a ring gear 74 in mesh with the pinion gear 75 on the end of a stub shaft 76 extending through a roller bearing 77 mounted in the end of a gear and hub housing portion 78 of housing 61, this gear and hub housing 78 also providing supporting means for roller bearings 80 and 81 through which the digger shaft 71 both rotates and slides. The stub shaft 76 is connected by universal joint 82 to a squared shaft 83 which telescopes into a squared sleeve 84 whose other end is connected by universal joint 85 to a stub shaft 86 journaled in a bearing 87 on the cross-frame member 31.

The stub shaft 86 is powered by a disc type clutch 88 connecting it to the motor shaft 21 by means of the clutch yoke 90 extending through an eye support 91 mounted on the cross-frame member 31. The other end of the clutch yoke 90 is linked by a connecting rod 92 to a bellcrank 93 pivoted at 94 on a frame section 95 and having its other end pivoted at 96 to a hand lever 97 extending through fastening 98 mounted on the chassis frame member 12. Manipulation of the hand lever 97 through its bellcrank, connecting link and clutch yoke will cause the disc type clutch 88 to engage or disengage the power shaft 21 through the stub shaft 86 to thus rotate the stub shaft 76 and through pinion gear 75, ring gear 74 and hub 72 to rotate the digging shaft 71.

By proper manipulation of the motor controls and of the gear shift 20 the digging shaft 71 can be caused to operate in first, second or third speed to thus cause the auger 100 to rotate at the desired speed, the auger 100 being suitably secured as by a pin 101 on the bottom of the digging shaft 71 and is provided with a lead screw 102. The first speed gear will be used when the ground is very hard, second speed gear will be used in average ground for most digging, while third speed gear may be used when the ground is very soft. Should the auger get stuck in the hole and be unable to advance, then the reverse gear may be used to cause it to climb out of the hole, thus freeing the auger.

As above pointed out, the sprocket 68 and roller chain 70 are used for raising or lowering the digging shaft 71. The digging shaft 71 is surrounded by a housing 103 whose lower end rests in a counterbore 104 extending upwardly from the housing 78, which provides a collar for securing the housing 103 thereto, the counterbore 104 being split at 105 and provided with fastening bolts 106. The housing 103 is open on one side at 107 to permit the return end 108 of roller chain 70 to extend therethrough. The upper end of digger shaft 71 is machined to a cone shape at 110 similar to an automobile front wheel spindle to fit to bearings 111 and 112. The extreme upper end of the shaft 71 is threaded to receive a nut 113 to secure a collar 114 which fits around the roller bearings 111 and 112 and lets the shaft turn therein. A yoke 115 welded to the end of collar 114 provides the means for securing the end of chain 70 thereto at 116, while a U-link 117 provides the means for securing the end of chain section 108 thereto.

The chain section 70 passes over a sprocket 118 supported on a shaft 120 having its ends journaled in bearings 121 adjustably secured by stud bolts 122 through a U-plate 123 at the top of housing 103. The bolts 122 thus serve for taking up any slack that may develop in the chain 70—108. As will be apparent, rotation of the sprocket 68 in one direction will raise the digging shaft 71, while rotation in the other direction will force it downwardly into the ground, but positioning the clutch lever 65 in the middle or neutral position detaches the shaft 71 from either raising or lowering power and instead lets it dig into the ground under its own weight and the pulling power of the auger 100 and its lead screw 102. The housing 61 which extends from the gear housing 78 acts as a pivoting center for the digging shaft and its associated parts in fore and aft direction.

A stanchion 124 welded to the top of housing 61 is bolted to the gear housing 40, thus supporting the shaft 43 and its associated parts for rotation about the housing 61 as an axis. Extending from the collar 46 is a pin 125 which is journaled in bearings 126 secured on the end of chassis frame 12. One end of said pin 125 is welded to collar 46. On the other end of housing 61 there is rotatably mounted a collar 127 which has a pair of extending bifurcated fingers 128 on opposite sides of a threaded screw 130 welded to the collar 127, a nut 131 on the threaded screw 130 having wings 132 extending through apertures 128a and 128b in the bifurcated fingers 128. The collar 127 rides up and down in a vertical slot 133 in one side of a box member 134, the threaded screw 130 providing the fourth side of the box. The box 134 is secured by means of a connection 135 to the chassis frame member 11. The threaded screw 130 is provided with washers 137 welded thereto at each end thereof, thus journaling the screw in the arms of the box member 134 and preventing it from traveling up or down. The top end of the screw 130 is squared as at 138 for cooperation with a hand crank 140 removably placed thereon for rotating the screw 30 causing the nut 131 to travel up or down and thus pivoting the housing 61 and all its related parts about the pin 125 as an axis, thus permitting the digging shaft 71 to be adjusted to any desired transverse angle, as shown at 71' and 71'' in Fig. 8.

In order to control the fore and aft angle, as shown at 103' and 103'' in Fig. 1, the housing 103 and its digger shaft 71 is pivoted within the collars 46 and 127. To control this, a boss 141 is welded to the side of the housing 103, and is provided with a pivot 142 to which one end of a double threaded shaft 143 is secured. The other end of the shaft 143 extends through a wing nut 145 journaled on the end of a house sleeve 146 whose other end is pivoted (not shown) to the chassis frame. The wing nut 145 is provided with wings 147 possibly six or eight inches in length for easy manual manipulation. Rotation of the wing nut 145 allows the digging shaft 71 to pivot fore or aft as shown in Fig. 1, as the housing 103 may be moved to any desired position, such as 103' or 103''. The housing 103 may be manipulated from between an almost horizontal position to an absolutely upright position or extended beyond the position shown at 103''.

In operation proper manipulation of the wing nut 145 and of the thread screw 130 by means of a hand crank 140, enables the digging shaft housing 103 and digging shaft 71 and auger 100 to be universally adjusted to any desired angle within reasonable limits, thus permitting a hole to be dug at any desired angle as well as permitting a hole to be dug that is absolutely vertical even though the vehicle wheels 13 and 14 are unevenly supported on an uneven ground surface.

To cause digging to take place the digger housing 103 is manipulated to the proper angle after the vehicle has been brought to the desired location. Then the motor 17 is operated to provide power and the hand lever 65 is caused to operate the clutch 52—53 so as to cause the chain 70 to lower the upper end of digger shaft 71 until the lead screw 102 is in contact with the ground where the hole is to be dug, the lever 65 then being kept in clutched position so as to force the auger 100 into the ground. Then, with the proper transmission gear engaged by means of gear shift lever 20, lever 97 is manipulated to operate the disc type clutch 88 and transmit power from the power shaft 21 to the stub shaft 76 and thus through hub 72 to rotate the digger shaft 71, auger 100 and lead screw 102 at the desired rate of speed according to the nature of the ground. When the auger has advanced into the ground a sufficient distance, the hole may be cleared of dirt by manipulating the hand lever 65 to the position for causing the chain 70 to raise the digging shaft 71, thus withdrawing the auger and dirt supported thereon. If desired, the rotation of the auger may be stopped while it is being raised to just about the top of the ground, whereupon it may be rotated in any speed and centrifugal force would clear it of dirt; then it may be dropped into the ground again and further digging may take place. Should the auger get stuck in the ground, or should it have been allowed to dig so far that it cannot raise the load of dirt above it, gear shift lever 20 may be shifted into reverse gear allowing the auger to dig itself partly or completely out of the hole as may be desired. By using the conventional automatic vacuum spark control on the distributor of the motor 17, the spark will advance and retard according to the load the motor is pulling. A vacuum governor may be used to control the gas feed, such as are conventional on the 1928 Buick motor. The telescopic power shafts 34—35 and 83—84 permit transmission of power between the power shafts and their respective elements irrespective of the angle at which the digging shaft may be set, particularly in view of the universal joints at each end of both power shafts.

While the preferred form of this invention has been shown and described, it will be understood that this invention is not restricted to the particular details of construction and arrangement hereinbefore set forth, but that changes in such details and construction may be made within the scope of what is hereinafter claimed without departing from the spirit of this invention.

Having thus set forth and described the nature of this invention, what is claimed is:

1. A portable hole digger including a vehicle having a conventional power motor and a conventional forward and reverse speed transmission mounted thereon, a power shaft extending from such motor transmission, a digger shaft and auger, means for universally angling said digger shaft in both transverse and fore and aft directions; comprising a digger shaft housing and a transverse housing secured thereto and forming an inverted T therewith, said transverse housing including a central hub housing section through which said digger shaft within said digger shaft housing slidably extends, transversely extending housing sections integral therewith, each of said transversely extending housing sections extending outwardly from opposite sides of said hub housing section, means for rotatably mounting said transverse housing sections comprising a collar rotatably mounted at each end of said housing sections, a journal pin mounted on one collar and extending radially therefrom, bearing means on said vehicle in which said pin is journaled, means mounted on said vehicle for raising and lowering the opposite end of said transverse housing sections about said journal pin for transversely angling said digger shaft housing and digger shaft, said latter means being operatively connected to the other of said collars, said collars permitting rotation of said digger shaft housing and digger shaft in a fore and aft direction, and means for pivoting said digger shaft housing and digger shaft fore and aft within said collars.

2. A portable hole digger including a vehicle having a conventional power motor and conventional forward and reverse speed transmission mounted thereon, a power shaft extending from such motor transmission, a digger shaft and auger, and means for universally angling said digger shaft in both transverse and fore and aft directions comprising, a digger shaft housing and a transverse housing secured thereto and forming an inverted T therewith, said transverse housing including a central hub housing section through which said digger shaft within said digger shaft housing slidably extends and transversely extending housing sections integral therewith, each section extending outwardly from opposite sides of said hub housing section, means for rotatably mounting said transverse housing comprising a collar rotatably mounted at each end, a journal pin mounted on one collar and extending radially therefrom, bearing means on said vehicle in which said pin is journaled, means mounted on said vehicle for raising or lowering the opposite end of said transverse housing about said journal pin for transverse angling of said digger housing and digger shaft, said latter means being operatively connected to the other of said collars, said collars permitting rotation of said digger housing and shaft in a fore and aft direction, means for pivoting said digger shaft housing and digger shaft fore and aft within said collars, means for transmitting power to said digger shaft in any angular position to rotate said shaft, and means to positively raise or lower said shaft or to permit said shaft to descend under its own weight.

3. A portable hole digger including a vehicle having a conventional power motor and conventional forward and reverse speed transmission mounted thereon, a power shaft extending from such motor transmission, a digger shaft and auger, and means for universally angling said digger shaft in both transverse and fore and aft directions comprising, a digger shaft housing and a transverse housing secured thereto and forming an inverted T therewith, said transverse housing including a central hub housing section through which said digger shaft within said digger shaft housing slidably extends and transversely extending housing sections integral therewith, each section extending outwardly from opposite sides of said hub housing section, means for rotatably mounting said transverse housing comprising a collar rotatably mounted at each end, a journal pin mounted on one collar and extending radially therefrom, bearing means on said vehicle in which said pin is journaled, a threaded jack screw mounted on said vehicle on the opposite side, nut means carried by the other transverse housing collar and threaded on said jack screw, said jack screw and nut serving to raise or lower said transverse angling of said digger housing and digger shaft, said collars permitting rotation of said digger housing and shaft in a fore and aft direction, and means for adjusting the fore and aft angle of said digger housing and digger shaft comprising a telescopic threaded shaft and sleeve, a manually operable nut journaled on said sleeve and threaded on said shaft, one end of said shaft and sleeve being pivotally mounted on said digger shaft housing and the other end on the vehicle.

4. A portable hole digger including a vehicle having a conventional power motor and conventional forward and reverse speed transmission mounted thereon, a power shaft extending from such motor transmission, a digger shaft and auger, and means for universally angling said digger shaft in both transverse and fore and aft directions comprising, a digger shaft housing and a transverse housing secured thereto and forming an inverted T therewith, said transverse housing including a central hub housing section through which said digger shaft within said digger shaft housing slidably extends and transversely extending housing sections integral therewith, each section extending outwardly from opposite sides of said hub housing section, means for rotatably mounting said transverse housing comprising a collar rotatably mounted at each end, a journal pin mounted on one collar and extending radially therefrom, bearing means on said vehicle in which said pin is journaled, a threaded jack screw mounted on said vehicle on the opposite side, nut means carried by the other transverse housing collar and threaded on said jack screw, said jack screw and nut serving to raise or lower said transverse housing about said journal pin for transverse angling of said digger housing and digger shaft, said collars permitting rotation of said digger housing and shaft in a fore and aft direction, means for adjusting the fore and aft angle of said digger housing and digger shaft comprising a telescopic threaded shaft and sleeve, and a manually operable nut journaled on said sleeve and threaded on said shaft, one end of said shaft and sleeve being pivotally mounted on said digger shaft housing the other end on the vehicle, and means for transmitting power to said digger shaft in any angular position to rotate said shaft, and means to positively raise or lower said shaft or to permit said shaft to descend under its own weight.

5. A portable hole digger including a vehicle having a conventional power motor and conventional forward and reverse speed transmission mounted thereon, a power shaft extending from such motor transmission, a digger shaft and auger, and means for universally angling said digger shaft in both transverse and fore and aft directions comprising, a digger shaft housing and a transverse housing secured thereto and forming an inverted T therewith, said transverse housing including a central hub housing section through which said digger shaft within said digger shaft housing slidably extends and transversely extending housing sections integral therewith, each section extending outwardly from opposite sides of said hub housing section, means for rotatably mounting said transverse housing comprising a collar rotatably mounted at each end, a journal pin mounted on one collar and extending radially therefrom, bearing means on said vehicle in which said pin is journaled, means for raising or lowering the opposite end of said transverse housing about said journal pin for transverse angling of said digger housing and digger shaft, the latter means comprising a threaded jack screw mounted on said vehicle at said opposite end of said housing, nut means threaded on said jack screw and operatively connected to the other transverse housing collar, said collars permitting rotation of said digger housing and shaft in a fore and aft direction, means for pivoting said digger shaft fore and aft within said collars, and means for transmitting power to said digger shaft in any angular position to rotate said shaft, and to positively raise or lower said shaft or to permit said shaft to descend under its own weight, said power transmitting means including said power shaft from said power motor transmission, a clutch controlled telescopic power shaft universally jointed thereto, a hub in said hub housing slidably keyed to said digging shaft, gear means universally connected to said clutch controlled telescopic power shaft for rotating said hub, a power take-off from said power shaft, a second telescopic power shaft universally jointed to said power take-off, a transverse shaft, means to mount the latter shaft for rotation parallel to said transverse housing, gear means universally connected to said second telescopic power shaft for rotating said transverse shaft, a sprocket journaled on said transverse shaft, a forward, neutral, and reverse clutch means connecting said sprocket to said transverse shaft, a second sprocket adjustably mounted at the top of said digging shaft housing, a sprocket chain about both said sprockets, and means connecting said chain to said digging shaft at the top thereof for holding, raising or lowering said digging shaft but permitting rotation thereof.

6. A portable hole digger including a vehicle having a conventional power motor and conventional forward and reverse speed transmission mounted thereon, a power shaft extending from such motor transmission, a digger shaft and auger, and means for universally angling said digger shaft in both transverse and fore and aft directions comprising, a digger shaft housing and a transverse housing secured thereto and forming an inverted T therewith, said transverse housing including a central hub housing section through which said digger shaft within said digger shaft housing slidably extends and transversely extending housing sections integral therewith, each section extending outwardly from opposite sides of said hub housing section, means for mounting said transverse housing comprising a collar rotatably mounted at each end, a journal pin mounted on one collar and extending radially therefrom, bearing means on said vehicle in which said pin is journaled, a threaded jack screw mounted on said vehicle on the opposite side, nut means carried by the other transverse housing collar and threaded on said jack screw, said jack screw and nut serving to raise or lower said transverse housing about said journal pin for transverse angling of said digger housing and digger shaft, said collars permitting rotation of said digger housing and shaft in a fore and aft direction, means for adjusting the fore and aft angle of said digger housing and digger shaft comprising a telescopic threaded shaft and sleeve, a manually operable nut journaled on said sleeve and threaded on said shaft, one end of said shaft and sleeve being pivotally mounted on said digger shaft housing and the other end on the vehicle, and means for transmitting power to said digger shaft in any angular position to rotate said shaft, and to positively raise or lower said shaft or to permit said shaft to descend under its own weight, said power transmitting means including said power shaft from said power motor transmission, a clutch controlled telescopic power shaft universally jointed thereto, a hub in said hub housing slidably keyed to said digging shaft, gear means universally connected to said clutch controlled telescopic power shaft for rotating said hub, a power take-off from said power shaft, a second telescopic power shaft universally jointed to said power take-off, a transverse shaft mounted for rotation parallel to said transverse housing, gear means universally jointed to said second telescopic power shaft for rotating said transverse shaft, a sprocket journaled on said transverse shaft, a forward, neutral, and reverse clutch means connecting said sprocket to said transverse shaft, a second sprocket adjustably mounted at the top of said digging shaft housing, a sprocket chain about both said sprockets, and means connecting said chain to said digging shaft at the top thereof for holding, raising or lowering said digging shaft but permitting rotation thereof.

GERALD H. LOOCK.

References Cited in the file of this patent

UNITED STATES PATENTS

| Number | Name | Date |
|---|---|---|
| 934,102 | Smith | Sept. 14, 1909 |
| 1,486,247 | Hunter | Mar. 11, 1924 |
| 1,595,851 | Brown | Aug. 10, 1926 |
| 1,643,549 | Donnelly et al. | Sept. 27, 1927 |
| 2,410,959 | Brown | Nov. 12, 1946 |